(12) United States Patent
Sakai et al.

(10) Patent No.: US 6,618,636 B1
(45) Date of Patent: Sep. 9, 2003

(54) COMPUTER SYSTEM AND METHOD FOR CONTROLLING TRANSMISSION OF AUDIO SIGNAL OUTPUTS FROM THE COMPUTER SYSTEM

(75) Inventors: Makoto Sakai, Tokyo (JP); Shinichi Furuta, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/177,821

(22) Filed: Oct. 23, 1998

(30) Foreign Application Priority Data

Oct. 30, 1997 (JP) .............................................. 9-298746

(51) Int. Cl.$^7$ .......................... G06F 17/00; H04R 29/00
(52) U.S. Cl. .......................................... 700/94; 381/58
(58) Field of Search ............................. 700/94; 381/77, 381/79, 124, 58, 59; 710/303, 304

(56) References Cited

U.S. PATENT DOCUMENTS

| | | | |
|---|---|---|---|
| 5,604,663 A | | 2/1997 | Shin et al. .................... 361/686 |
| 5,832,438 A | * | 11/1998 | Bauer .......................... 704/270 |
| 5,917,916 A | * | 6/1999 | Sibbald et al. ................ 381/74 |
| 6,148,243 A | * | 11/2000 | Ishii et al. ..................... 700/94 |
| 6,148,353 A | * | 11/2000 | Cho ............................. 700/94 |
| 6,321,278 B1 | * | 11/2001 | Phu et al. ..................... 710/14 |
| 6,374,148 B1 | * | 4/2002 | Dharmarajan et al. ......... 700/94 |

FOREIGN PATENT DOCUMENTS

| | | |
|---|---|---|
| JP | 5-11692 | 2/1993 |
| JP | 9-120354 | 5/1997 |

* cited by examiner

Primary Examiner—Xu Mei
(74) Attorney, Agent, or Firm—Oblon, Spivak, McClelland, Maier & Neustadt, P.C.

(57) ABSTRACT

A computer system including a built-in speaker, a sound controller configured to receive audio signals, including system warning signals, and configured to supply the received audio signals to the built-in speaker. Also included is a decoder configured to decode digital audio data read from a digital storage media, such as a DVD ROM, and a converter which supplies analog audio signals to the sound controller by converting the decoded audio data. Further, the computer system includes a detector which detects whether the computer system is coupled through a jack to the external audio system, and a transmission prohibiting mechanism which prohibits transmission of the decoded digital audio data to the sound controller when the detector detects the computer system is coupled to the external audio system. Also included is a method for operating the computer system which includes the steps of decoding digital audio data from a high density digital data storage media, such as a DVD-ROM, and coupling the computer to an external system having a high sound quality. The method also includes prohibiting a transmission route of the decoded audio data from the DVD-ROM to the built-in speaker when the computer is coupled to the external audio system, even though the built-in speaker is an active state for reproducing other audio signals, such as a system beep sound.

18 Claims, 4 Drawing Sheets

COMPUTER SYSTEM AND METHOD FOR CONTROLLING TRANSMISSION OF AUDIO SIGNAL OUTPUTS FROM THE COMPUTER SYSTEM

BACKGROUND OF THE INVENTION

1. Field of the Invention

The present invention relates to a computer system and a method for controlling transmission of audio signal outputs from the computer system.

In particular, the present invention relates to a computer system utilizing a digital versatile disk-read only memory (DVD-ROM) as storage media for storing both video and audio information, and to a method for controlling audio signals output from the DVD-ROM in the computer system.

2. Discussion of the Background

In recent years, because of the advance of computer technology and multimedia technology, various types of computer systems (e.g., portable type or notebook type computers) have been developed which utilize a multimedia storage device.

Generally, multimedia type computer systems include various devices for reproducing motion picture data, audio data and also text or graphics data.

With recent technological advances of a digital versatile disk (DVD), attention has been directed to utilizing the DVD in a computer system as a new storage media especially in light of the conventionally utilized compact-disk read only memory (CD-ROM).

Presently, a DVD-ROM can store about 4.7 Giga-Byte worth of data on one surface side, which is about 7 times that of the conventional CD-ROM data storage capability. In addition, because the DVD-ROM can store data on both surface sides, it is possible to store as much as 9.4 Giga-Byte worth of data with a single DVD-ROM.

Consequently, the computer system using the DVD-ROM as a data storage device can reproduce a large amount of high quality video and audio data. This means that a movie or other title can be reproduced in the computer system, while maintaining a high picture quality.

To store video data or other information on the DVD-ROM, the video data usually includes presentation data and navigation data. The presentation data corresponds to video objects and generally includes video data, sub-picture data and audio data. The video data is compressed and coded according to a motion picture expert group 2 (MPEG2) standard.

The coding of sub-picture data and audio data is supported by a run-length coding or a Dolby AC-3 coding process. The sub-pictures are bit-map data and are used for superimposing textual information, such as a name of the movie picture, or dialogue on a movie picture and for displaying choices on a menu screen.

In addition, one video object can include video data for one channel, audio data for a maximum of 8 channels and sub-picture data for a maximum of 32 channels, for example.

The navigation data is reproduction controlling data for reproducing presentation data and it is possible to insert a navigation command in the navigation data. In addition, the navigation command may be used to change reproducing contents or the reproducing order of the video data. Thus, it is possible to create an interactive title by defining various multi-point constructions using the navigation command.

For reproducing the title or movie stored in the DVD, the data read from a DVD-ROM drive is stored in a main memory of the computer, and then the stored data is transferred to a MPEG2 decoder. The MPEG2 decoder executes a de-scrambling operation because the coded rows of the video data corresponding to the title are previously scrambled to prevent unlawful copying.

After the de-scrambling operation, the video data, the sub-picture data and the audio data are respectively decoded. The decoded video and sub-picture data is displayed on a display monitor or a television screen by a display controller in the computer. The decoded audio data is reproduced by a speaker through an audio controller included in the computer.

As explained above, the audio data is included in the title stored on the DVD. Further, the audio data is 5.1 channels of data coded by the Dolby AC3 coding process.

To enjoy a surround effect of reproduced audio data, the personal computer may be coupled to an external audio system. This may be achieved by including audio output terminals in the personal computer to couple the computer to an external audio system.

However, a problem occurs when the computer is coupled to an external audio system, due to a built-in speaker included in the computer. That is, for the case of a computer coupled to an external audio system and which includes a built-in speaker, the DVD audio data is reproduced both with the external audio system and the built-in speaker.

This destroys a quality sound balance for the external audio system, due to a down mixing sound from the built-in speaker. In addition, if the built-in speaker is disabled to achieve a desired quality sound balance of the external audio system, warning sounds, such as a system beep cannot be produced.

Consequently, during a reproduction of DVD audio data, it is impossible to inform a user of an abnormal state of the computer, such as a low battery state.

SUMMARY OF THE INVENTION

Accordingly, one object of the present invention is to solve the aforementioned problems of the conventional computer system.

Another object of the present invention is to provide a novel method and computer system for controlling a reproduction of DVD audio data through an external audio system with a high quality sound by eliminating an unwanted sound effect from a built-in speaker.

Yet another object of the present invention is to provide a novel method for controlling a reproduction of a warning sound, such as a system beep whenever a system emergency may occur.

These and other objects are achieved according to the present invention by providing a computer system, which includes a built-in speaker, a sound controller configured to receive audio signals, including system warning signals, and configured to supply the received audio signals to the built-in speaker. Also included is a driver configured to drive digital data, including digital audio data, from a digital data storage media, a decoder configured to decode the digital audio data, and a converter connected to the sound controller. The converter is configured to supply analog audio signals to the sound controller by converting the decoded audio data into the analog signals. In addition, a e jack configured to couple the computer system to an external audio system is included along with a detector configured to detect whether the computer system is coupled through the jack to the external audio system.

Also included is a transmission prohibiting mechanism configured to prohibit transmission of the decoded digital audio data to the sound controller when the detector detects the computer system is coupled to the external audio system.

The present invention also includes a method for controlling a computer system, which includes the steps of decoding digital audio data read from a digital data storage media (e.g., a DVD-ROM), and coupling the computer system to an external audio system. Also included is a step for prohibiting transmission of the decoded digital audio data to the built-in speaker when the computer system is coupled to the external audio system, even though the built-in speaker is an active state for reproducing other audio signals than the decoded audio data from the DVD-ROM, such as a system beep sound.

That is, the computer system according to the present invention inhibits the transfer of the decoded audio data to the audio controller when the computer is coupled to an external audio system. Thus, the decoded audio data is supplied only to the external audio system.

Therefore, according to the present invention, it is possible to reproduce high quality decoded digital audio signals from the DVD to the external audio system without negatively affecting a system warning sound, such as a system beep sound from the built-in speaker.

BRIEF DESCRIPTION OF THE DRAWINGS

A more complete appreciation of the present invention and many of the attendant advantages thereof will be readily obtained as the same becomes understood by reference to the following detailed description when considered in connection with the accompanying drawings, wherein.

DESCRIPTION OF THE PREFERRED EMBODIMENTS

Figure 1:
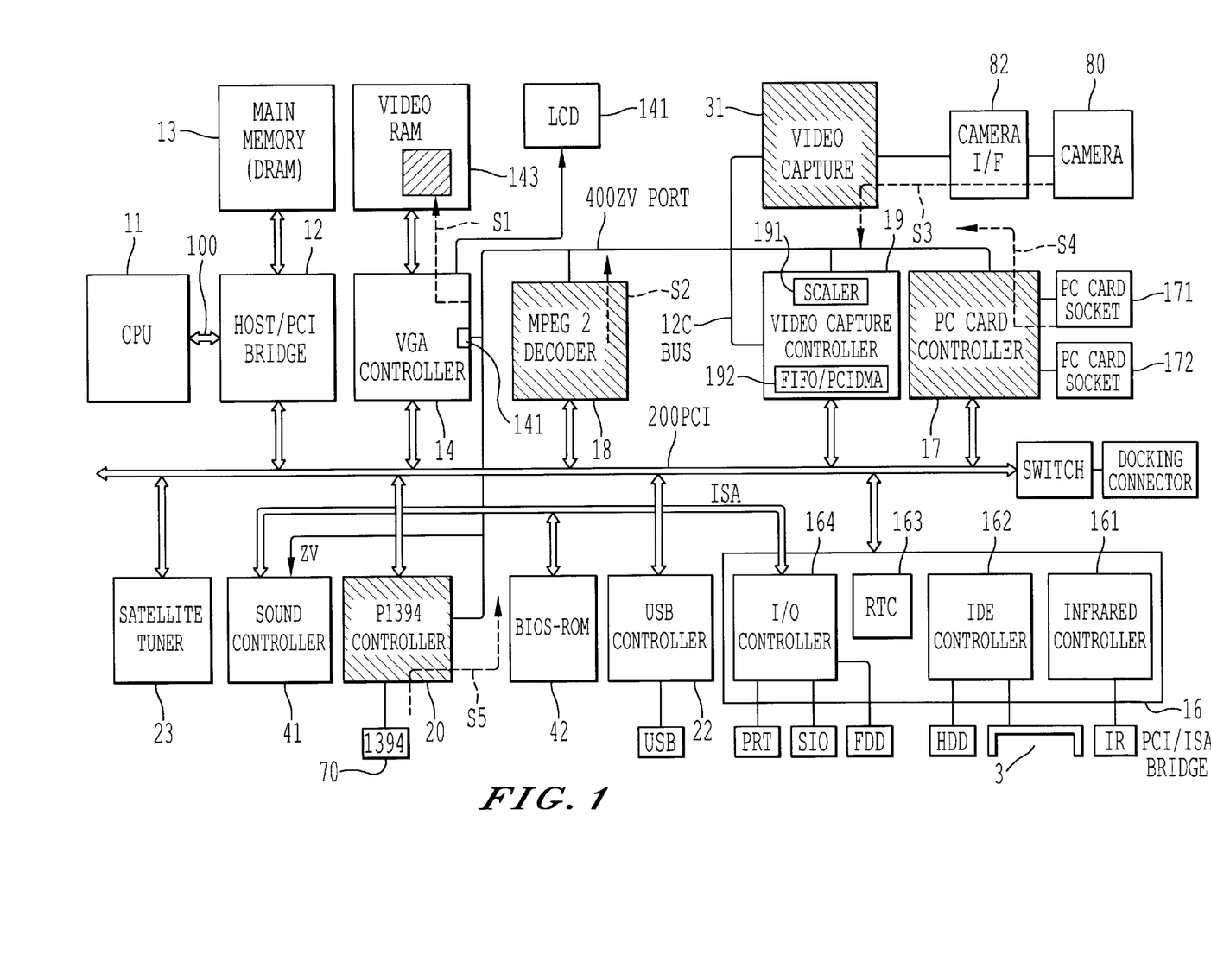
FIG. 1 is a block diagram illustrating components of a computer system according to the present invention.

Referring now to the drawings; wherein like reference numerals designate identical or corresponding parts throughout the several views, and more particularly to FIG. 1 thereof, there is illustrated a notebook type computer system that can be driven by a battery power source. As shown in FIG. 1, a CPU bus 100, a peripheral component interconnect (PCI) bus 200, an ISA bus 300 and a ZV port 400 are included on a system board of the computer system.

The ZV port 400 is a dedicated point-to-point type connection video/audio bus for directly connecting PC card sockets 171, 172, a display controller (VGA controller) 14, and a sound controller 41.

The video bus of the ZV port 400 includes a group of signal lines for transmitting digital YUV data. The group of signals lines include 8 bit signal lines for brightness data (Y), 8 bit signal lines for chrominance data (UV), and signal lines for transmitting horizontal synchronizing signals (HSYNC), vertical synchronizing signals (YSYNC) and pixel clocks (PCLK). The 8 bit signal lines for transmitting YUV digital data include a total of 16 bits corresponding to the 422 standard image format.

The audio bus of the ZV port 400 includes pulse-code modulation (PCM) signal lines for serially transmitting audio data, signal lines for indicating whether the present audio data output is supplied through a left channel or a right channel (LRCK), and signal lines for transmitting serial clocks.

Further, as shown in FIG. 1, a CPU 11, a host/PCI bridge 12, a main memory 13, a display controller 14, a PCI/ISA bridge 16, a PC card controller 17, an MPEG decoder 18, a video capture controller 19, a P1394 controller 20, a universal serial bus (USB) controller 22, a satellite tuner 23, a video capture 31, a sound controller 41, and a BIOS-ROM 42 are provided on the system board.

The PC card controller 17, the MPEG2 decoder 18, the P1394 controller 20, and the video capture 31 are devices used for treating motion pictures. Further, motion picture output ports for the respective devices are commonly coupled to the ZV port 400 for transmitting the motion picture to the display controller 14.

The CPU 11 controls all operations of the computer system and executes data processes. The CPU used may be one readily available in the market, such as a PENTIUM 8 microprocessor sold under the trademark of Intel Corp. U.S.A. In addition, input/output pins of the CPU 11 are directly connected to the CPU bus 100 which includes a data bus width of 64 bits, for example.

The main memory 13 stores an operating system (OS), device drivers, executing application programs and processed data. Further, the main memory 13 includes a plurality of dynamic random access memory (DRAM) modules, a system memory preset on the system board, and an extended memory added by a user when necessary. The DRAM modules for the system memory and the extended memory may be, for example, a DRAM or a Rambus DRAM.

The host/PCI bridge 12 is a large-scale integrated circuit (LSI) for controlling the CPU 11 and the PCI bus 200. It also operates as a bus master for the PCI bus 200. The host/PCI bridge 12 has functions for two-way transforming bus cycles, which include data and addresses between the CPU bus 100 and the internal PCI bus 200, and for controlling access to the main memory 13 through a memory bus.

The PCI bus 200 is a clock synchronized type input/output bus in which all bus cycles on the PCI bus 200 are synchronized to PCI bus clocks. A maximum frequency of a PCI bus path clock is 22 MHZ, for example. In addition, the PCI bus 200 includes a time divisional address/data bus having a bus width of 32 bits, for example. Further, each of the data transmitting cycles on the PCI bus 200 includes an address phase and one or more data phases following the address phase. During the address phase, an address and a type of transmission are provided. In the data phase, data of 8 bits, 16 bits, 24 bits or 32 bits is supplied.

The display controller 14 is also a bus master for the PCI bus 200, similar to the host/PCI bridge 12. The display controller 14 is used for displaying image data in a video memory (VRAM) 143 on a liquid crystal display (LCD) 141 or to an external cathode ray tube (CRT) display (not shown). Further, the display controller 14 supports the display of text and graphics under VGA specifications.

As shown in FIG. 1, the display controller 14 includes a video port 141 for establishing a connection with the ZV port 400. The display controller 14 controls a display of a video data stream S1, which is supplied via the video port 141 as a video window on the display screen.

The PCI/ISA bridge 16 is a bridge LSI for connecting the PCI bus 200 and the ISA bus 300. The PCI/ISA bridge 16 includes a plurality of I/O controllers, such as an infrared controller 161, an IDE controller 162, a real time clock (RTC) 163, and an I/O controller 164.

The infrared controller 161 controls infrared communications between external infrared communication devices. The IDE controller 162 controls devices which have an IDE or ATAPI interface, such as a built-in HDD, a second HDD being selectively installed in a selectable bay 3, and a CD-ROM drive.

The I/O controller 164 controls a printer port (PRT), a serial port (SIO), and a floppy disk drive (FDD). Further, the I/O controller 164 controls devices connected on the ISA bus 300.

The PC card controller 17 is for controlling PC cards, such as a 16 bit PC card having a PCM/ISA specification or a 32 bit PC card having a card bus specification. Further, the PC card controller 17 supports transmission of motion picture/audio data through ZV port 400. The PC card controller 17 is one of the PCI devices controlled by the CPU 11.

In addition, the PC card controller 17 has two action modes; a normal mode and a multimedia mode (ZV port mode). The normal mode is used for controlling data transmission between a normal PC card (e.g., a MODEM card) and the PCI bus 200. During the normal mode, the PC card controller does not use the ZV port 400.

The multimedia mode (ZV port mode) is used when one of a video capture card, a MPEG2 encoder, and a MPEG2 decoder card is mounted into either one of the PC card sockets 171 or 172 for handling motion picture/audio data. During the multimedia mode (ZV port mode), a motion picture data stream (S4) is directly transmitted from the PC card to the display controller 14 through the ZV port 400.

The CPU 11 selects either the normal mode or the multimedia mode. That is, the CPU 11 reads attribute information contained in the PC card mounted in the PC card sockets 171 or 172 and detects a type of the PC card. If the CPU 11 detects that the PC card is a multimedia mode type card, the CPU 11 selects the multimedia mode for the PC card controller 17.

The sound controller 41 executes an input and output operation of audio data and is controlled by the CPU 11. The sound controller 41 controls the storage of audio data into the memory 13 by converting analog audio signals from a microphone terminal to digital audio data. Further, the sound controller 41 controls the output of the digital audio data being transmitted through the ZV port 400 to the built-in speaker by converting the digital audio data to analog signals.

The MPEG2 decoder 18 has video and audio output ports, which are respectively coupled to the PCI bus 200 and to the ZV port 400 through the PCI interface. The MPEG2 decoder 18 receives motion picture data from a DVD-ROM drive through the PCI bus 200. Because the received motion picture data from the DVD-ROM drive is coded under the MPEG2 digital compression form, the decoder 18 executes a decoding or extending operation to de-scrambling the scrambled motion picture data.

The decoded motion picture data is converted into the 16 bits YUV data format. In addition, the converted motion picture data is supplied to the ZV port 400 as the video stream S2 and is transmitted to the video input port 141 of the display controller 14.

Normally, the MPEG2 data stream read from the DVD-ROM drive is formed by multiplexing coded video data for main images (e.g., a movie), coded sub-picture data for sub-images (e.g., a title), and coded audio data.

The run length coding and the Dolby AC3 coding processes are used for coding the sub-images and the audio signals, respectively. Accordingly, the MPEG2 decoder 18 divides the MPEG2 data stream into the video data, sub-picture data and audio data for the appropriate decoding process.

The decoded video data and the decoded sub-picture data in the MPEG2 decoder 18 is assembled and supplied on a defined video bus on the ZV port 400 under the 16 bits YUV data format.

The decoded audio data decoded by the audio decoder in the MPEG2 decoder 18 is transmitted through a defined audio bus on the ZV port 400 under a serial data transfer format. Further, the decoded audio data is directly supplied to the audio terminal, as explained in FIG. 2.

The video capture controller 19 controls the operation of the video capture 31 via a bus 12C based on instructions from the CPU 11. Further, the video capture controller 19 transmits motion picture data from the ZV port 400 to the main memory 13 via the PCI bus 200.

In consideration of a bandwidth of the PCI bus 200 for the transmission of the motion picture from the ZV port 400 to the main memory 13, a built-in scaler 191 in the video capture controller 19 scales down the motion picture data to decrease a transmission rate. The scaling down operation includes conversions of frame rate, resolution and color format.

In addition, the scaled down motion picture data is stored in a first-in first-out (FIFO) buffer 192. Then, the stored data in the FIFO buffer 192 is transmitted to the main memory 13 by direct memory access (DMA) transmission.

The P1394 controller 20 controls data transmission between an external device through a P1394 high speed serial interface 70. The P1394 controller also includes a PCI interface for coupling to the PCI bus 200 and a motion picture port for coupling to the ZV port 400.

In a case motion picture data is supplied from a digital video camera 80 through the P1394 high speed serial interface, the P1394 controller 20 transmits the motion picture data to the VGA display controller 14 as a motion picture stream S5. The P1394 controller 20 transmits the motion picture stream S5 via a video bus defined on the ZV port 400 by converting the motion picture data to the 16 bits YUV data format.

When the computer system receives image data from a digital satellite broadcasting, the satellite tuner 23 transmits the received image data to the main memory 13. The received image data from the digital satellite broadcasting is a MPEG2 stream and signal processing of the image data is accomplished by the MPEG2 decoder 18, similar to the video data from the DVD-ROM driver. In addition, the video capture 31 transmits video data from the video camera 80 or an image sensor through a camera interface 82 to the display controller 14. The video data is transmitted as the motion picture stream S3 through a video bus defined on the ZV pot 400 by converting the video data to the 16 bit YUV data format.

The BIOS-ROM 42 stores a system basic I/O system (BIOS) for controlling various hardware devices. The system BIOS includes a POST routine for initializing and testing memories, peripheral devices and various LSI circuits, when the power source is turned ON.

Figure 2:
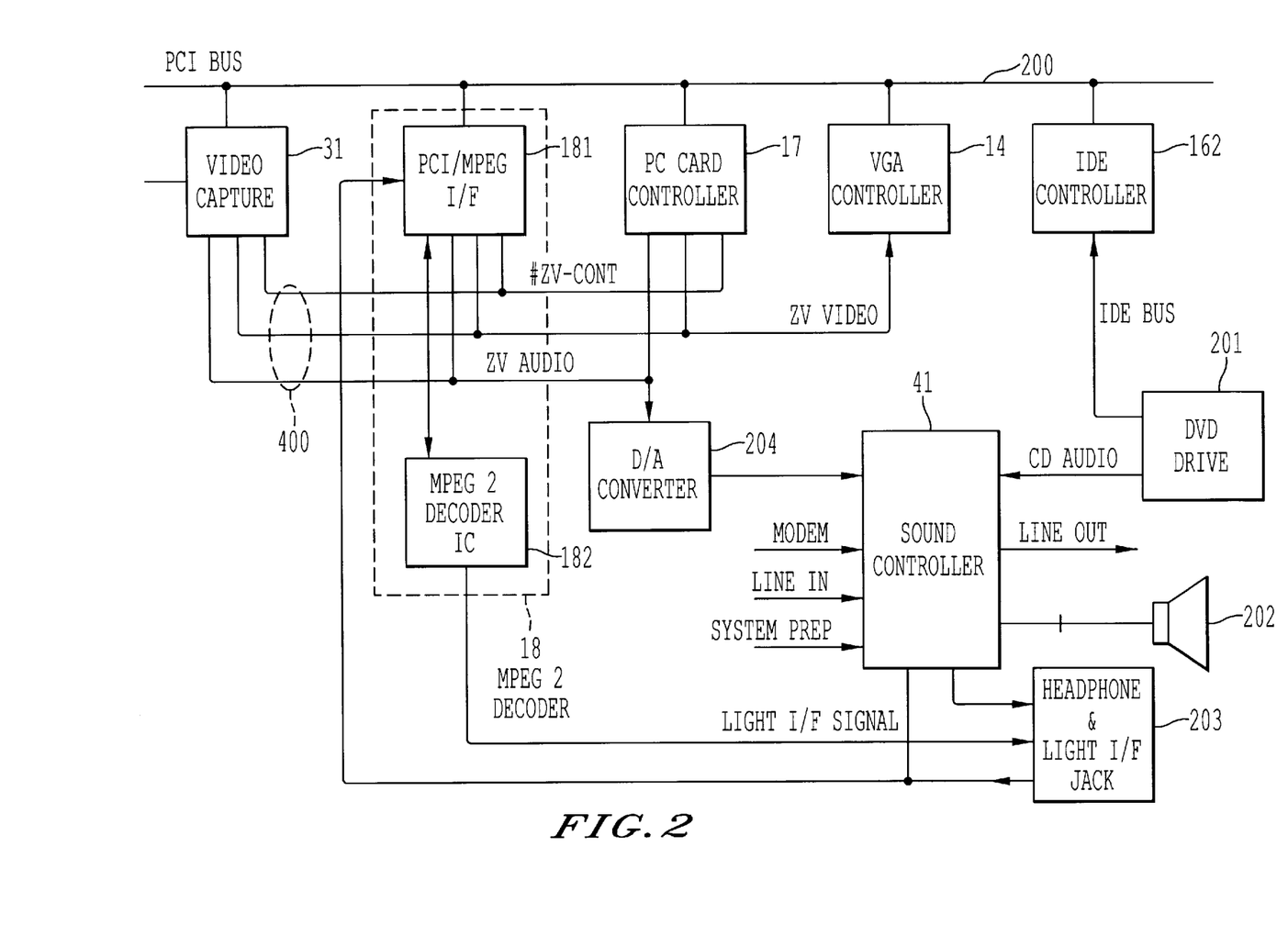
FIG. 2 is a block diagram illustrating components of an audio signal controlling mechanism for a notebook type personal computer.

FIG. 2 is a diagram for explaining a method of controlling an output of the audio data according to the present invention.

In a case where the computer system is not connected to the external audio system, the data read from a DVD-ROM drive 201 is supplied, as a DVD stream (MPEG2 stream), to a PCI/MPEG interface 181 via an IDE controller 162 and the PCI bus 200. The MPEG2 decoder 18 includes the PCI/IMPEG interface 181 and a MPEG2 decoder IC 182.

The PCI/IMPEG interface 181 couples the PCI bus 200 and the MPEG2 decoder IC 182. Thus, the MPEG2 stream may be transmitted from the PCI bus 200 to the MPEG2 decoder IC 182, and the decoded video/audio data in the MPEG2 decoder IC 182 may be output to the video bus (ZV VIDEO) and the audio bus (ZV AUDIO) on the ZV port 400.

The decoded audio data by the MPEG2 decoder IC 182 is surround data of 5.1 CH. The audio data is converted by the PCI/MPEG interface 181 into digital data of a time series and is supplied to the audio bus (ZV AUDIO).

During reproduction of a DVD title, the PCI/MPEG interface 181 occupies the ZV port 400 by generating a #ZV-CONT signal and the decoded video/audio data by the MPEG2 decoder IC 182 is supplied to the video bus (ZV VIDEO) and the audio bus (ZV AUDIO) on the ZV port 400.

The ZV VIDEO data is displayed on a display monitor by the display controller 14. In addition, the ZV AUDIO data is converted into analog signals by a D/A converter 204 and supplied to a sound controller 41.

The sound controller 41 is also referred to as a sound chip or an audio controller and it includes both an analog circuit and a digital circuit.

In addition to an output signal from the DIA converter 204, the sound controller 41 receives digital CD audio signals reproduced by the DVD-ROM drive 201. Further, the sound controller 41 receives sound signals from a MODEM, a LINE-IN or other various system beep sounds, such as a warning sound indicating a low battery state.

In addition, for a user using a headphone or an earphone, the sound controller 41 outputs the audio signals to a headphone jack (earphone jack) 203.

Usually, a light interface is used for coupling the computer system to the outside audio system. To accomplish this, the MPEG2 decoder IC 182 includes a circuit for outputting the DVD audio signals through the light interface. This circuit supplies the decoded DVD audio signals for driving a light emitting diode in the light interface. Thus, the coupling to the external audio system is integrated with the headphone jack 203.

The coupling between the headphone jack 203 and the external audio system is detected by the PCI/MPEG interface 181 through a jack detection signal. When the system is coupled to the external audio system and such a state is detected, the supply of DVD audio signals to the ZV AUDIO bus is prohibited. The jack detection signal is also transmitted to the sound controller 41 for prohibiting signal outputs from the sound controller 41 to the headphone jack 203.

Consequently, the DVD audio signals are reproduced by the external audio system only. Namely, the built-in speaker 202 does not reproduce the DVD audio signals.

However, since the sound controller 41 and the built-in speaker 202 are still active for reproducing other audio signals (i.e., signals other than the DVD audio signals), a system warning signal may be reproduced by the built-in speaker 202.

Figure 3A:
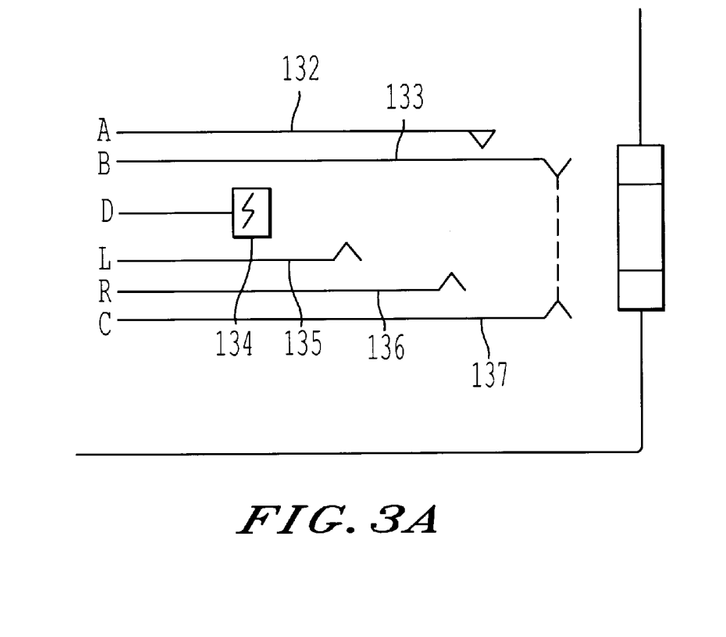
FIG. 3A shows a mounted jack in the computer system.
Figure 3B:
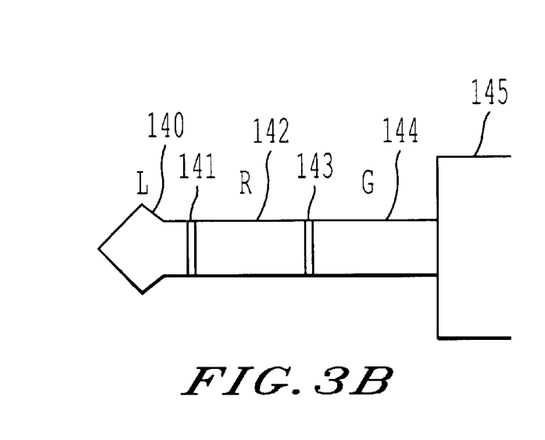
FIG. 3B shows a headphone plug to be mounted into the jack shown in FIG. 3A.
Figure 3C:
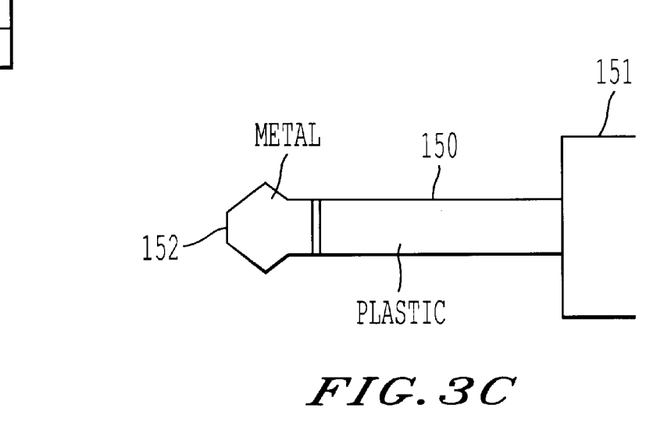
FIG. 3C shows a light interface plug for an external audio system to be mounted into the jack shown in FIG. 3A.

FIGS. 3A, 3B, and 3C explain an electrical connection between the system and the external audio system, and also explain a coupling detection circuit. In particular, FIG. 3A shows a mounted jack in the computer system, FIG. 3B shows a headphone plug to be mounted into the jack shown in FIG. 3A, and FIG. 3C shows a light interface plug for the external audio system to be mounted into the jack shown in FIG. 3A.

When a user of the system uses the headphone, the headphone plug depicted in FIG. 3B is mounted in the jack shown in FIG. 3A so as to couple a contact 135 in the jack to a front portion 140 of the plug. Similarly, a contact 136 of the jack couples to an intermediate portion 142 of the plug. Because the contacts 135 and 136 are coupled to the headphone jack 203 (FIG. 2), L and R (i.e., Left and Right) sound signals from the sound controller 41 may be heard using the headphone.

In addition, the contact 137 of the jack is grounded. By coupling the contact 137 and an edge portion 144 of the plug, a shield of the headphone cable is also grounded. As shown in FIG. 3B, each of the L, R, and G portions of the plug are respectively separated by insulators 141 and 143. Further, the light interface plug shown in FIG. 3C has a similar size as the headphone plug and includes of a fin shaped metal portion and an insulator portion 150 formed with a plastic material, for example. The contact of a light fiber, which extends through the plastic portion 151 of the plug 150, is located just behind the fin shaped metal portion which has an opening portion 152.

In addition, as shown in FIG. 3A, the light interface jack includes a light emitting diode 134 for receiving a light interface signal from the MPEG decoder IC 182. When the jack is mounted to the light interface plug, the light emitting diode 134 is disposed so as to face against the opening portion 152 of the light interface plug. Namely, the circuit for transmitting the DVD audio signals to the outside audio system has been constructed.

The light interface jack includes detecting contacts A 132 and B 133 for detecting the connection between the system and the external audio system. The contact B 133 touches the edge portion 144 of the headphone plug. When the headphone plug has been mounted in the jack, the contact B 133 is connected to a ground contact C 137 through the edge portion 144 of the headphone plug as shown by a dotted line in FIG. 3A.

Even when the light interface plug has been mounted in the jack, the contact B 133 is not coupled to the contact C 137, because the insulator portion 150 of the light interface plug exists between them.

In addition, when the plug has been mounted into the jack, the contact A 132 touches the contact B 133. Further, when the plug has been pulled out from the jack, the contact A 132 separates from the contact B 133.

Consequently, the following three states of the jack-plug relationship can be discriminated/detected by checking the connection relationship among the contacts A, B and C.

State A: No plug has been mounted on the jack.
State B: The headphone plug has been mounted in the jack.
State C: The light interface plug has been mounted in the jack.

Two signals from the contacts A 132 and B 133 (i.e., signals A and B) are supplied to the PCI/IMPEG interface 181 as a 2-bit jack discriminating signal.

Based on the signals A and B, the PCI/MPEG interface 181 provides a detecting signal corresponding to the status of the connection state with the external audio system for prohibiting output of DVD audio digital signals to the ZV AUDIO bus.

As explained above, the inhibition of the digital signals can be achieved easier than the inhibition of the analog signals. Further, the decoded DVD audio signals in the MPEG2 decoder IC 182 are reproduced by the external audio system only through the light interface.

Figure 4:
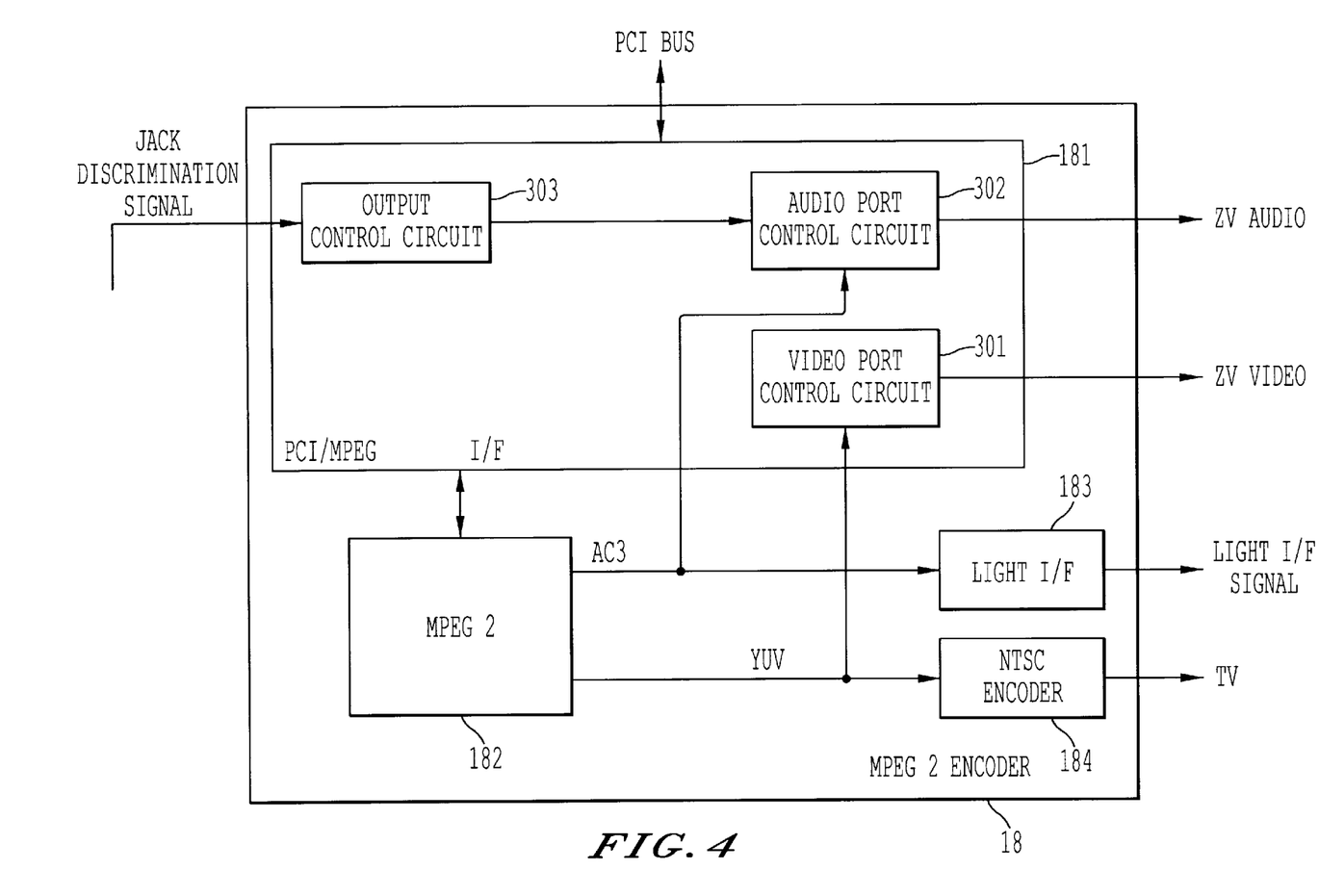
FIG. 4 shows a practical construction of the MPEG2 decoder included in the notebook type personal computer.

FIG. 4 is a diagram illustrating a composition of the MPEG2 decoder 18 which includes the PCI/MPEG interface 181 and the MPEG2 decoder IC 182.

The PCI/MPEG interface 181 includes a video port control circuit 301, an audio port control circuit 302, and an output control circuit 303. The video port control circuit 301 outputs the decoded video data decoded by the MPEG decoder IC 182 on the ZV VIDEO bus. The audio port control circuit 302 outputs the decoded audio data decoded by the MPEG2 decoder IC 182 on the ZV AUDIO bus. Further, the output control circuit 303 discriminates whether or not the light interface plug has been mounted in the jack based on the jack detecting signals A and B.

When an insertion state of the light interface plug is detected, the output control circuit 303 disconnects the coupling between the audio port control circuit 302 and the ZV AUDIO bus to prohibit audio data from being transmitted to the ZV AUDIO bus.

The MPEG2 decoder 18 further includes a light interface 183 for generating a drive signal for the light emitting diode in the headphone jack 202 based on the decoded audio data by the MPEG2 decoder IC 182. Also included is a NTSC encoder 184 for converting the decoded video data by the MPEG2 decoder IC 182 into TV image signals conforming to an NTSC standard.

In a case the headphone jack 203 has not been coupled to the external audio system, the decoded audio data in the MPEG2 decoder IC 182 is supplied to the headphone jack 203 and to the sound controller 41 in a simplified data format through the ZV AUDIO bus. In this case, the decoded audio data in the MPEG2 decoder IC 182 is reproduced by the built-in speaker 202 and has a down-mixed audio signal of a relative narrow band.

Consequently, if a system beep sound is provided, the system beep sound can be reproduced by the built-in speaker 202. Thus, if the headphone plug is mounted into the headphone jack 203, the output from the sound controller 41 changes from the built-in speaker 202 to the headphone so as to halt the drive of the built-in speaker 202.

Further, if the light interface plug of the external audio system has been coupled to the headphone jack 203, the coupling state is informed to the output control circuit 303 in the PCI/IMPEG interface 181 by the jack discrimination signal. Thus, the PCI/MPEG interface 181 prohibits the output of the audio data by the audio port control circuit 302. Because the transmission route of the audio data from the MPEG2 decoder IC 182 to the sound controller 41 has been disconnected, the input of the decoded audio data by the MPEG2 decoder IC 182 to the sound controller 41 through the ZV AUDIO bus is prohibited.

Consequently, the decoded audio data by the MPEG2 decoder IC 182 is reproduced by the external audio system, while still driving the built-in speaker 202. Therefore, if a system warning signal has been input, the user can hear the system beep sound from the built-in speaker 202.

As explained in detail, the method according to the present invention for controlling audio signals output by the computer system does not prohibit the drive of the built-in speaker 202 itself, but disconnects the transmission route of the DVD audio data from the MPEG2 decoder IC 182 to the sound controller 41 to restrain the reproduction of the DVD audio data by the built-in speaker 202.

Consequently, it is possible to reproduce sounds other than the DVD audio data, such as a system beep sound, without influencing the reproduction of the DVD audio data by the external audio system. Namely, it is possible to reproduce a high quality DVD audio data while simultaneously maintaining the output of system warning signals.

It is also possible to apply the control method according to the present invention to other audio data than the DVD audio, such as audio data received by the satellite tuner 23 or CD audio. Similarly, this audio data can be reproduced by the external audio system alone by disconnecting the input to sound controller 41.

Further, it is also possible to use a LINE OUT terminal for coupling the light interface plug of the external audio system, or to provide an exclusive light interface jack for use with the audio system in order to discriminate an insertion of the light interface plug.

This invention may be conveniently implemented using a conventional general purpose digital computer or microprocessor programmed according to the teachings of the present specification, as will be apparent to those skilled in the computer art. Appropriate software coding can be readily prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the teachings. It is therefore to be understood that within the scope of the appended claims, the invention may be practiced otherwise than as specifically described herein.

What is claimed is:

1. A computer system, comprising:
   a built-in speaker;
   a sound controller configured to receive audio signals, including system warning signals, and to supply the received audio signals to the built-in speaker;
   a driver configured to drive digital data, including digital audio data, from digital data storage media;
   a decoder configured to decode the digital audio data from the driver;
   a converter connected to the sound controller and configured to supply analog audio signals to the sound controller by converting transmitted decoded digital audio data into the analog signals;
   a jack configured to couple the computer system to an external audio system;
   a detector configured to detect whether the computer system is coupled through the jack to the external audio system; and
   a transmission prohibiting mechanism configured to prohibit the decoded digital audio data from being transmitted to the sound controller when the detector detects the computer system is coupled to the external audio system,
   wherein the sound controller supplies the system warning signals to the built-in speaker and the decoder transmits the decoded digital audio data to the external audio system through the jack, when the detector detects the computer system is coupled to the external audio system.

2. The computer system according to claim 1, wherein the digital data includes digital video data, and the decoder decodes the digital video data.

3. The computer system according to claim 1, wherein the system warning signals comprise a signal indicating a low battery state of the computer system.

4. The computer system according to claim 1, wherein the jack includes a plug configured to receive a headphone adapter.

5. The computer system according to claim 1, wherein said jack comprises a light interface jack.

6. The computer system according to claim 1, wherein the digital data storage media includes at least one of a digital versatile disk (DVD) and a compact disk (CD).

7. A computer system having a built-in speaker configured to reproduce various analog audio signals, comprising:

a driver configured to read digital data, including digital audio data, as a coded data stream from storage media;

an audio controller configured to control a supply of an audio signal selected among the various analog signals to the built-in speaker;

an audio terminal configured to couple the computer system to an external audio system;

an audio data decoder configured to decode the digital audio data read by the driver, and to selectively supply the decoded audio data to the audio controller and the audio terminal;

a detector configured to detect whether the audio terminal is coupled to the external audio system; and a transmission prohibiting mechanism configured to prohibit the decoded audio data from being transmitted to the audio controller when the detector detects the audio terminal is coupled to the external audio system, wherein the decoder directly supplies the decoded digital audio data to the audio terminal without passing through the audio controller, when the detector detects the computer system is coupled to the external audio system.

8. The computer system according to claim 7, wherein the audio terminal includes a headphone plug, and a light interface plug configured to couple the computer system to the external audio system, and the detector detects if either one of the headphone plug and light interface plug is coupled to the audio terminal.

9. The computer system according to claim 7, wherein the digital data includes digital video data, and the audio data decoder decodes the digital video data.

10. The computer system according to claim 7, wherein the digital data storage media includes at least one of a digital versatile disk (DVD) and a compact disk (CD).

11. A method for controlling audio output signals applicable to a computer system which includes a built-in speaker, an audio controller for controlling a reproduction of audio signals by the built-in speaker, an audio terminal for coupling the computer system to an external audio system, an audio data decoder for decoding received digital audio data and for selectively supplying the decoded digital audio data to the audio controller and to the audio terminal, comprising:

detecting whether the audio terminal is coupled to the external audio system; and prohibiting transmission of the audio digital data from the audio data decoder to the audio controller and directly supplying the decoded digital audio data from the audio data decoder to the external audio system through the audio terminal without passing through the audio controller, when the detecting step detects that the audio terminal is coupled to the external audio system.

12. A method for controlling audio output signals applicable to a computer system which includes a built-in speaker driving mechanism configured to output said audio output signals, and a driver for reading a coded data stream, including audio data, from storage media storing digital compressed coded data, comprising:

discriminating whether the audio terminal is coupled to an external audio system; and prohibiting a transmission route of the audio data, based on the coded data stream read from the storage media, to the built-in speaker driving mechanism and directly supplying the audio data after being decoded to the external audio system, when the discriminating step determines the audio terminal is coupled to the external audio system.

13. A computer system, comprising:

means for driving digital data, including digital audio data, from a digital data storage media;

means for receiving audio signals, which include system warning signals and said digital audio data, and for supplying the received audio signals to a built-in speaker;

means for decoding the digital audio data from said means for receiving;

converter means for supplying analog audio signals to the means for receiving by converting transmitted decoded audio data into the analog signals;

means for coupling the computer system to an external audio system;

means for detecting whether the computer system is coupled by said means for coupling to the external audio system; and means for prohibiting the decoded digital audio data from being transmitted to the means for receiving and directly supplying the decoded digital audio data to the external audio system, when the means for detecting detects the computer system is coupled to the external audio system.

14. The computer system according to claim 13, wherein the digital data includes digital video data, and the means for decoding decodes the digital video data.

15. The computer system according to claim 13, wherein the system warning signals comprise a signal indicating a low battery state of the computer system.

16. The computer system according to claim 13, wherein the means for coupling comprises a plug configured to receive a headphone adapter.

17. The computer system according to claim 13, wherein the means for coupling comprises a light interface jack.

18. The computer system according to claim 13, wherein the digital data storage media includes at least one of a digital versatile disk (DVD) and a compact disk (CD).

* * * * *